United States Patent [19]

Camus

[11] 4,167,089

[45] Sep. 11, 1979

[54] PANEL ASSEMBLY AND A PANEL ELEMENT FOR A PANEL ASSEMBLY

[76] Inventor: Raymond F. E. Camus, 27, avenue Foch, 75016 Paris, France

[21] Appl. No.: 866,943

[22] Filed: Jan. 4, 1978

[30] Foreign Application Priority Data

Jan. 10, 1977 [FR] France .................................. 77 00520

[51] Int. Cl.² .............................................. E04C 2/22
[52] U.S. Cl. ..................................... 52/309.7; 52/584
[58] Field of Search ................. 52/309.4, 309.7, 309.8, 52/309.9, 309.10, 309.11, 584, 602; 428/322

[56] References Cited

U.S. PATENT DOCUMENTS

| 3,791,912 | 2/1974 | Allard | 52/309.7 |
| 4,075,811 | 2/1978 | Keith | 52/584 |

FOREIGN PATENT DOCUMENTS

Ad.79725 12/1962 France ........................................ 52/584

*Primary Examiner*—John E. Murtagh

*Attorney, Agent, or Firm*—Haseltine, Lake & Waters

[57] ABSTRACT

A panel assembly for constructing a building, comprising a plurality of panel elements in juxtaposed relation. The panel elements are generally rectangular and have peripheral rims and a flange extending from each of a pair of opposed sides of the rims. The panel elements have a lightweight core of hard plastic foam with a fiber glass reinforced resin covering and reinforcement rods (e.g. at the corners of the panel element) embedded in the resin and bonded to the core and the covering. An apertured reinforcing plate is preferably welded to each of a pair of adjacent reinforcement rods on a panel element. A stud bolt secures a panel element to a juxtaposed panel element or another structural member, e.g., on the foundation, and is tightened on the reinforcing plate. The reinforcing plate is in the rim or on the flanges. When joining two juxtaposed panel elements a single stud bolt secures a pair of reinforcing members together. The bolts are accommodated in cavities in the panel elements and sealed off with plugs also of hard foam.

11 Claims, 4 Drawing Figures

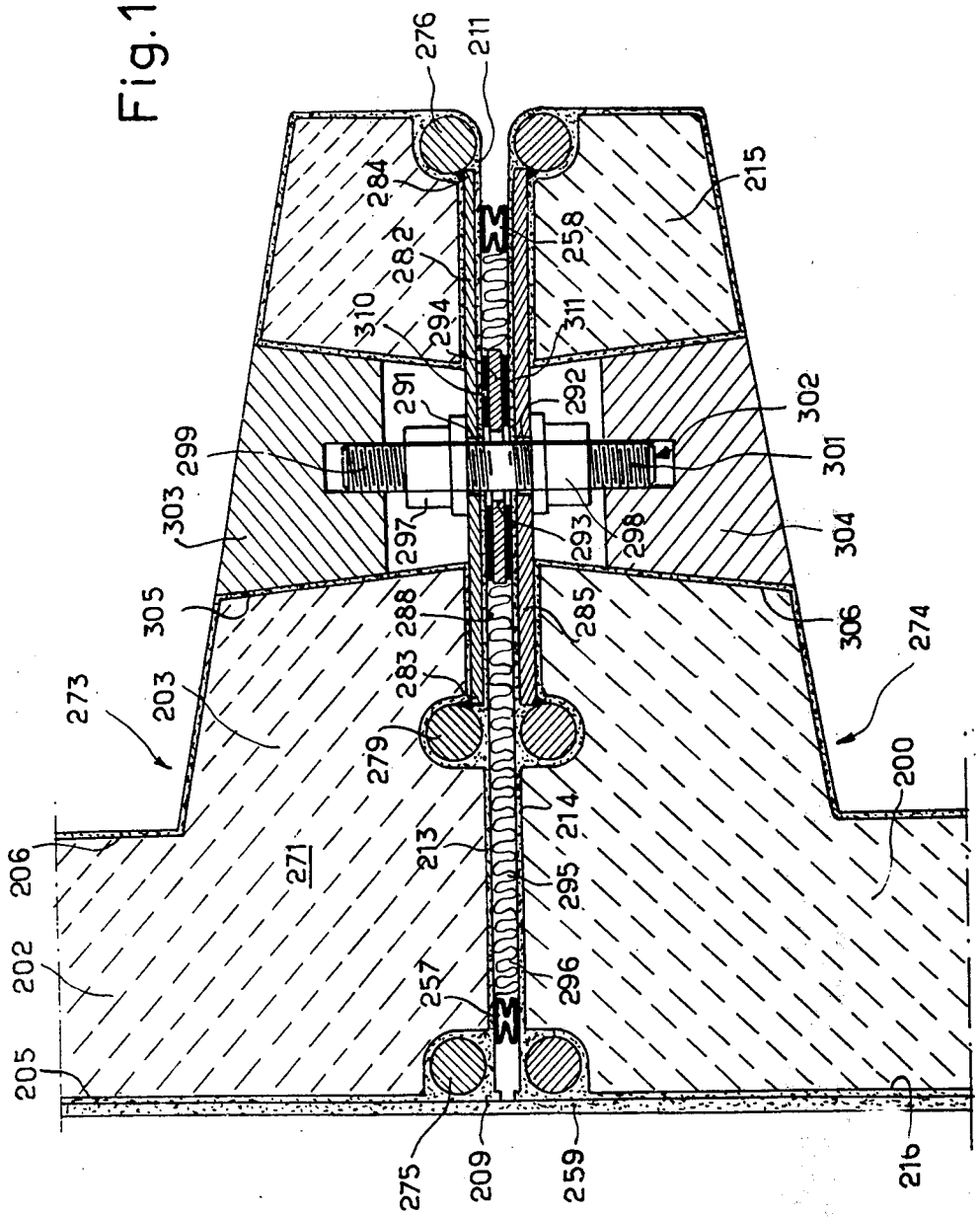

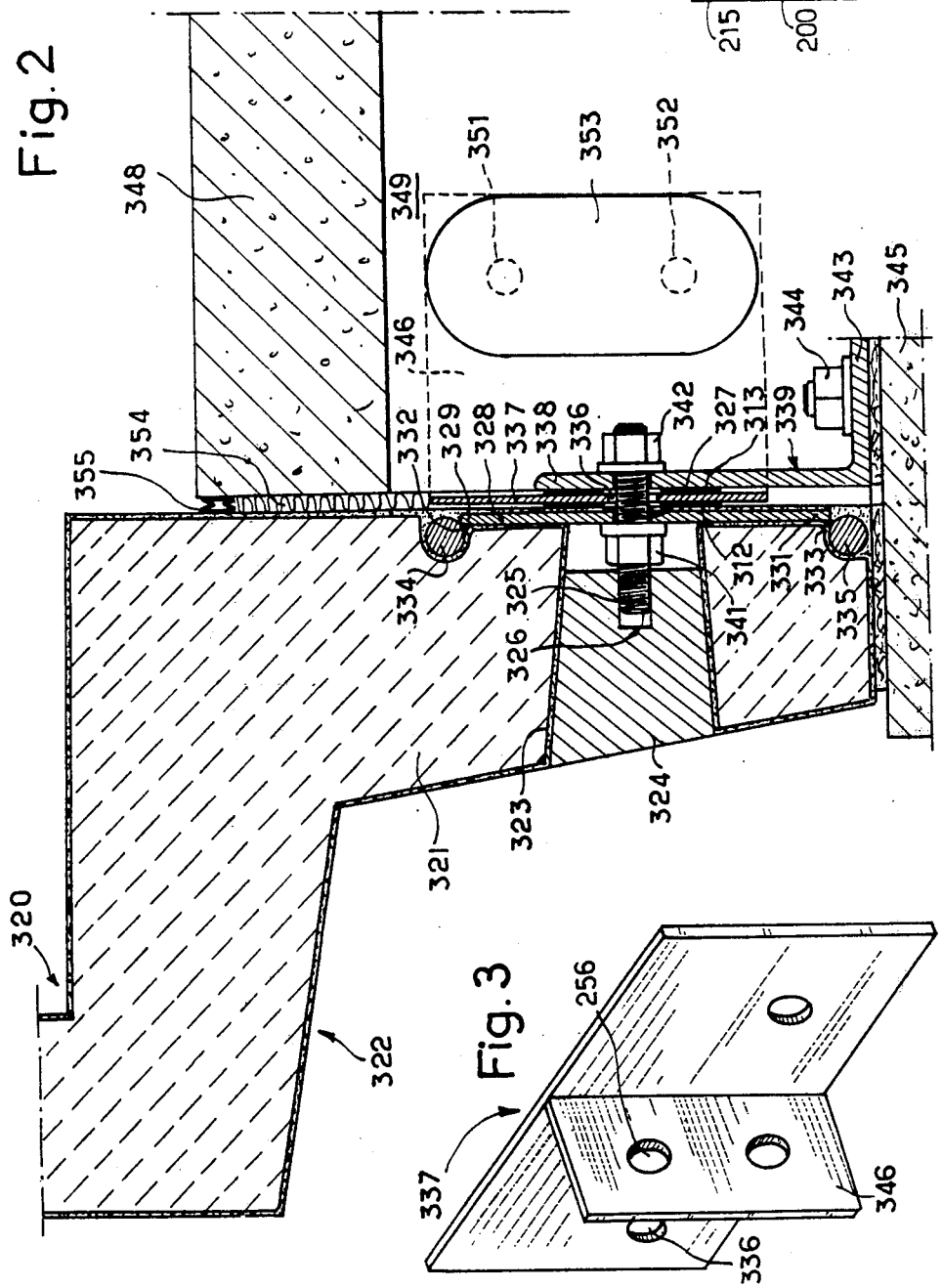
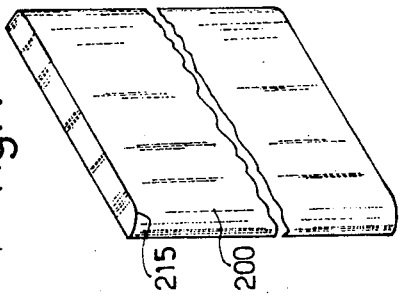
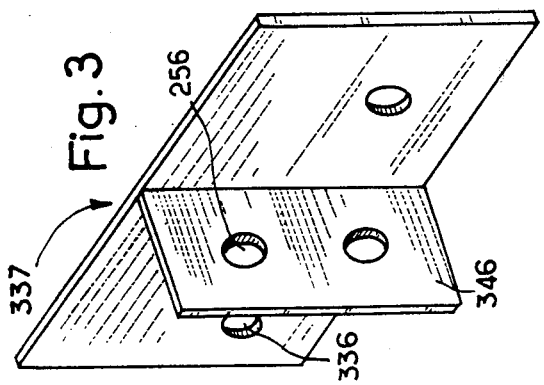

PANEL ASSEMBLY AND A PANEL ELEMENT FOR A PANEL ASSEMBLY

The present invention relates generally to rimmed panel elements for building construction, of the type comprising a central portion and a shallow rim depending perpendicularly therefrom; flanges projecting from the rim on the short sides generally parallel to the flat central portion may also be provided thereon.

Facades of buildings are constructed from such panel elements in juxtaposed relation, their lower flanges being fixed to the foundation and laterally adjacent panel elements being assembled together along their adjoining rims. Buildings constructed from such panel elements are for reasons of subdivision and structural rigidity divided by wall and floor panels.

The present invention relates more particularly to panel assemblies and to assembly joints for assembling such panel elements together and to the foundation of the building.

A more specific object of the invention is the provision of a panel assembly of rimmed panel elements of the above configuration and comprising a body or core of lightweight plastics material, such as hard plastics foam material, a fiber reinforced resin covering, the reinforcing fibers preferably being glass fibers, steel reinforcement rods or members being disposed proximate to the surface of the panel elements and embedded in fiber reinforced resin covering which adheres to the core or body of hard foam material and thereby ensures the transmission of forces exerted against a such panel element directly or through other such panel elements with which it is joined.

According to the invention there is provided a panel assembly of panel elements of the foregoing type bolted to one another, comprising parallel reinforcement rods or members embedded in resin constituting the covering of the panel element, a steel reinforcing plate being interposed between adjacent reinforcement members, an assembly bolt extending through the reinforcing plate so that the strength of the ultimate assembly joint is as high as that of a joint in an all-steel construction.

The reinforcements rods or members between which the reinforcing plates are arranged are advantageously welded to the associated reinforcement rods or members. The reinforcing plates are preferably located spaced from the outer face of their panel elements which precludes the formation of thermal bridges or leaks which militate against temperature maintenance inside the building when it is greatly different from the temperature of the surroundings, which is particularly important in the case of buildings constructed in extreme climates.

The following description, given by way of example, makes reference to the accompanying drawings, in which:

FIG. 1 is a fragmentary sectional view through the rims of two adjacent panel elements, in the vicinity of their assembly zone;

FIG. 2 is a section view of a panel assembly of a facade panel element with a foundation element, and a floor panel element; and FIG. 3 is a perspective view of a junction plate used in the panel assembly of FIG. 2;

FIG. 4 is a diagrammatic view of a panel at a smaller-scale.

A first, facade panel element 273 (FIG. 1) comprises a flat central portion 202 and a peripheral rim 203. The panel element may be of generally rectangular rimmed configuration. The panel element advantageously comprises a lightweight plastics core or body 271, e.g. of hard plastics foam material, with two coverings 205 or 206 of fiber glass reinforced resin, a steel reinforcement rod or member 275 being provided at the outer edge of the connecting zone between the central portion 202 and the rim 203 and another reinforcement rod or member 276 proximate to the outer edge of the rim 203, the reinforcement members 275 and 276 being embedded, respectively at 209 and 211, in fiber glass reinforced resin which forms part of the coverings 205 and 206.

The flange 203 is provided with an intermediate reinforcement member in addition to end reinforcement members 275 and 276.

A steel reinforcing plate 282 is welded along its edges 283 and 284 to reinforcement members 279 and 276. The outer surface 288 of the reinforcing plate lies flush, that is, it is merely covered with a fiber glass reinforced resin covering 213' similar to coverings 205 and 206.

A second, facade panel element 274 of construction similar to that of panel element 273 adjoins the latter. The panel elements 273 and 274 have the outer faces 213 and 214 of their respective rims 203 and 215 facing each other; outer surfaces of the coverings 205 and 216 are coplanar.

The reinforcing plate 282 of panel element 273 and the corresponding reinforcing plate 285 of panel element 274 have holes 291 and 292 respectively, in registry with hole 293 in junction plate 294 sandwiched in interstitial space 295 which, in addition, is lined with insulating material 296.

The panel elements are assembled by tightening nuts 297 and 298 on threaded portions 299 and 302 of an assembly or stud bolt 302 and which bear against force distributing washers 310 and 311 disposed respectively on each side of the junction plate 294.

The resultant assembly joint is comparable to an assembly joint in an all-steel construction.

The joint may have a single stud bolt 302 with corresponding nuts or several such stud bolts in which case one junction plate with a plurality of holes is used in association with the several stud bolts.

Caulking seals 257 and 258 may be provided as shown at the ends of the interstitial space 295 between adjoining panel elements 273 and 274.

An outer covering 259 may be applied to coverings 205 and 216.

The ends of the threaded portions 299 and 301 of the stud bolt 302 are advantageously capped with tapered plugs 303 and 304. Each plug is received in a corresponding frustoconical cavity 305, 306 defined in the course of molding the panel elements 273 and 274. Plugs 303 and 304 may be formed of the same hard foam material of which the cores of the panel elements are made. They have a heat insulating function.

The threaded portions 299 and 301 of the stud bolt 302 may be used for hanging or attaching equipment inside the room defined in part by panel elements 273 and 274.

In the form of construction illustrated in FIG. 2, a flange 321 on rim 322 of panel element 320 likewise comprises a frustoconical cavity 323 serving to accomodate a plug 324 capping the end of the threaded portion 325 of stud bolt 326. The stud bolt 326 extends through the hole 324 provided in steel reinforcing plate 328 having edges 329 and 331 welded at 332 and 333 to reinforcement rods or members 334 and 335 disposed in the vicinity of the surface of the panel element 320. The stud bolt 326 also passes through hole 336 in a junction plate 337 (FIG. 3) which bears along its faces through force distributing washers 312 and 313 against the flanges 321 of the panel element 320 and on the other facing leg 338 of an angle iron 339.

The assembly joint is tightened by a first nut 341 with a washer, cooperating with a threaded portion of stud bolt 326 and a second nut 342 with a washer, cooperating with the other threaded portion of stud bolt 326.

The other leg 343 of angle iron 339 serves to fasten the same to a foundation element 345 with a nut 344.

The junction plate 337 (FIG. 3) has a perpendicular portion 346 available for fastening, with bolts 351 and 352, the flange 349 of a floor panel element 348. Bolts 351 and 352 passing through holes 256 in the perpendicular portion 346 on the junction plate 337 are capped with a plug 353 of oval configuration, having an insulating and continuity function.

The assembly joint further comprises fiber glass linings as shown at 354 and also caulking seals as shown at 355.

FIG. 4 shows a panel element having a peripheral rim 215 and a plat portion 200, the rim being reinforced by steel rods.

What I claim is:

1. A panel assembly comprising a plurality of rimmed rectangular panel elements in juxtaposed relation with rims of juxtaposed panel elements facing each other, each said panel element comprising a core of hard, aerated material, a fiber reinforced covering enveloping said core, and reinforcement rods embedded in fiber reinforced resin in continuity with said covering for bonding said reinforcement members to both said core and said covering, an apertured reinforcing plate interconnecting adjacent reinforcement members by being welded thereto, reinforcing plates of juxtaposed panel elements facing each other with their apertures in registry, and an assembly bolt passing through said apertures in registry for clamping said reinforcing plates together to form an assembly joint.

2. A panel element having a peripheral rim comprising a core of hard foam material and a covering of fiber glass reinforced resin, steel reinforcing members or rods embedded in the fiber reinforced resin and arranged in the corners of said panel element, said reinforcing members or rods having reinforcing plates welded therebetween.

3. In a panel assembly comprising a plurality of juxtaposed panel elements, wherein; each panel element comprises a core of lightweight construction, a fiber reinforced resin covering around the core, and reinforcement members embedded in fiber reinforced resin in continuity with the covering and bonding the reinforcement members to the core and the cover, the improvement comprising: a reinforcing plate disposed between adjacent reinforcement members and being welded thereto, each said panel element being adapted to be joined to a juxtaposed said panel element or another structural element by an assembly bolt through its said reinforcing plate.

4. The panel assembly according to claim 3, wherein said reinforcing plate is in facing relation with another structural element, an assembly bolt securing said panel element to said other structural element extending through its associated reinforcing plate.

5. The panel assembly according to claim 3, wherein said adjacent reinforcing members are interconnected by their associated reinforcing plate.

6. The panel assembly according to claim 3, wherein said adjacent reinforcing members are welded to their associated reinforcing plate.

7. The panel assembly according to claim 3, wherein said panel elements have peripheral rims and said reinforcing plates are disposed along the outer faces thereof.

8. The panel assembly according to claim 3, wherein said panel elements have peripheral rims and flanges extending from said peripheral rims at least along a pair of opposed sides of said panel elements, said reinforcing plates being disposed along the outer faces of said flanges.

9. The panel assembly according to claim 3, wherein some said reinforcement members are disposed in the corners of said panel elements.

10. In a panel assembly comprising a plurality of juxtaposed panel elements, wherein; each panel element comprises a core of lightweight construction, a fiber reinforced resin covering around the core, and reinforcement members embedded in fiber reinforced resin in continuity with the covering and bonding the reinforcement members to the core and the cover, the improvement comprising: a reinforcing plate disposed between adjacent reinforcement members and being welded thereto, said reinforcing plate of said juxtaposed panel element is in facing relation with said reinforcing plate of said panel element juxtaposed thereto such that the assembly bolt extends through said facing reinforcing plates and a cavity in each said panel element facing its reinforcing plate such that the associated assembly bolt is accommodated therein, and a plug seals off the cavity outward of said assembly bolt.

11. The panel assembly according to claim 10, wherein the plug is formed of material similar to hard plastics foam material of which the cores of said panel elements are made.

* * * * *